June 1, 1954  B. F. FROEHLICH  2,679,787
TURNTABLE PROVIDED WITH INDEXING MASKING MEANS
Filed July 7, 1953  2 Sheets-Sheet 1

INVENTOR.
BERNARD F. FROEHLICH
BY
Zugelter & Zugelter
Attys.

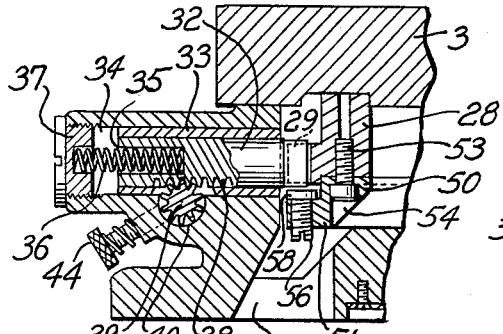
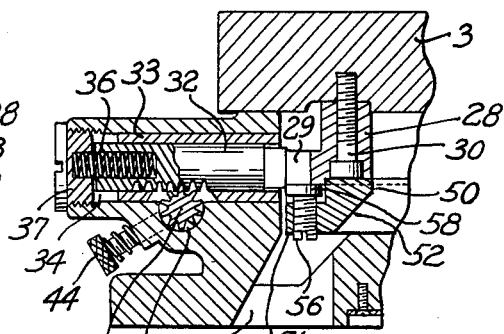
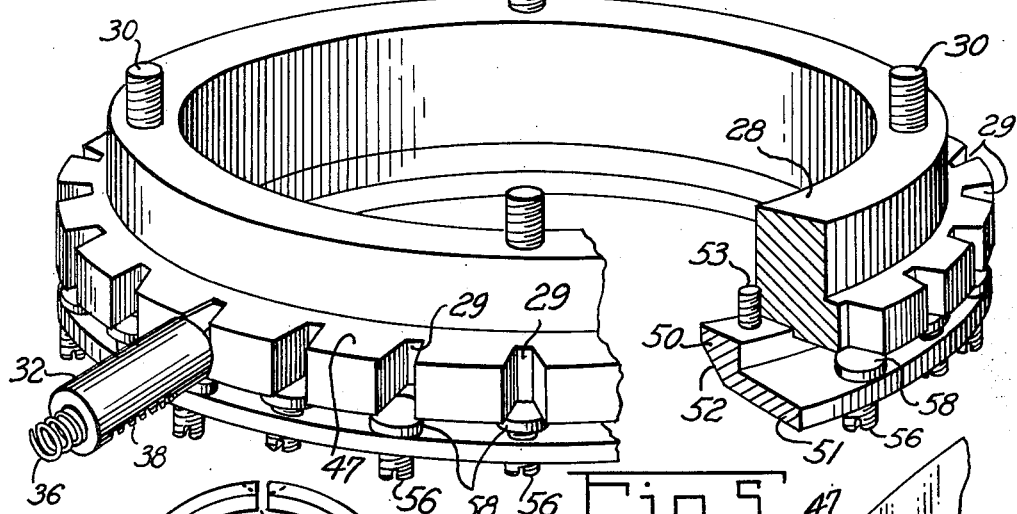
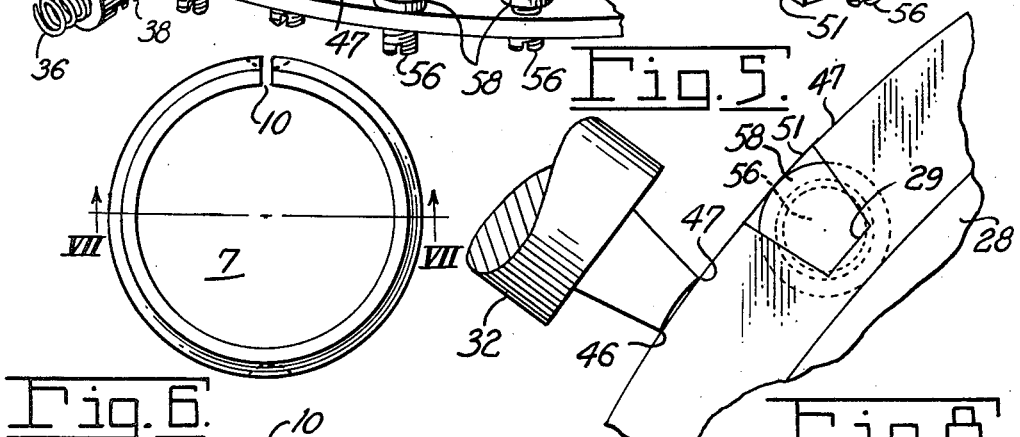
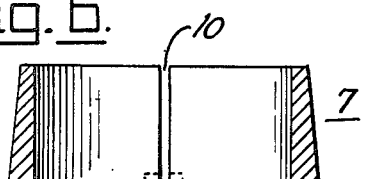
INVENTOR.
BERNARD F. FROEHLICH
BY
Jugelter & Jugelter
Attys.

Patented June 1, 1954

2,679,787

UNITED STATES PATENT OFFICE 2,679,787

TURNTABLE PROVIDED WITH INDEXING MASKING MEANS

Bernard F. Froehlich, Hamilton County, Ohio

Application July 7, 1953, Serial No. 366,434

6 Claims. (Cl. 90—56)

This invention relates to index tables, and more particularly to a novel masking means and brake mechanism therefor.

An object of this invention is to provide an indexing table that is relatively inexpensive but accurate, and reliable in operation.

Another object of the invention is to provide an indexing table, in which the wear of the spindle can be taken up as and when the wear is sufficient to allow play between the table and base thereof.

Another object of the invention is to provide a brake mechanism whereby the table may be firmly clamped to the base, thereby preventing wobbling and shifting of the table when work is being performed thereby.

A still further object of the invention is to provide a masking device for a turntable, which is secured to the table at all times, and which masking device includes independently and selectively actuatable masks, thereby predetermined index notches may be masked at will, to suit a particular job.

Other objects of the invention will be apparent to those of ordinary skill in the art to which this invention pertains, from the following description taken in conjunction with the accompanying drawings.

In the drawings:

Fig. 3 is a partial view in section taken on line III—III of Fig. 1, showing the index pin seated in an index notch of the index ring;

Fig. 4 is a view similar to Fig. 3, showing the index pin masked out of an indexing notch;

Fig. 5 is a view in perspective of the index pin and masking device assembly, embodied in the turntable of Figs. 1 and 2, the remainder of the device being omitted, part of the assembly being broken away and in section.

Fig. 6 is a top plan view of a bushing embodied in the turntable;

Fig. 7 is a view in section taken on line VII—VII of Fig. 6; and

Fig. 8 is a view of the inner end of the index pin and a portion of the index ring, showing the contour of the inner end of the pin, and how it rides on the periphery of the index ring.

Figure 1:
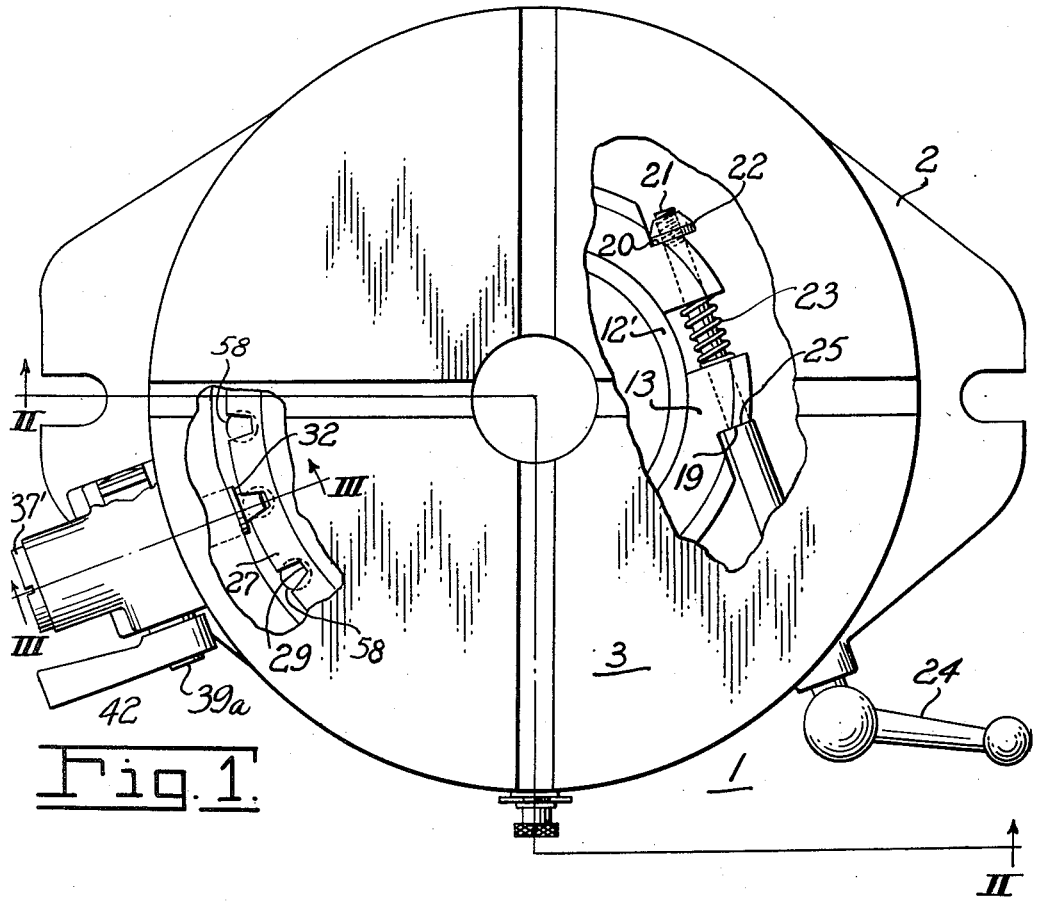
Figure 1 is a top plan view of an index table arranged and constructed in accordance with an embodiment of the invention, certain portions of the table being broken away to reveal hidden parts.
Figure 2:
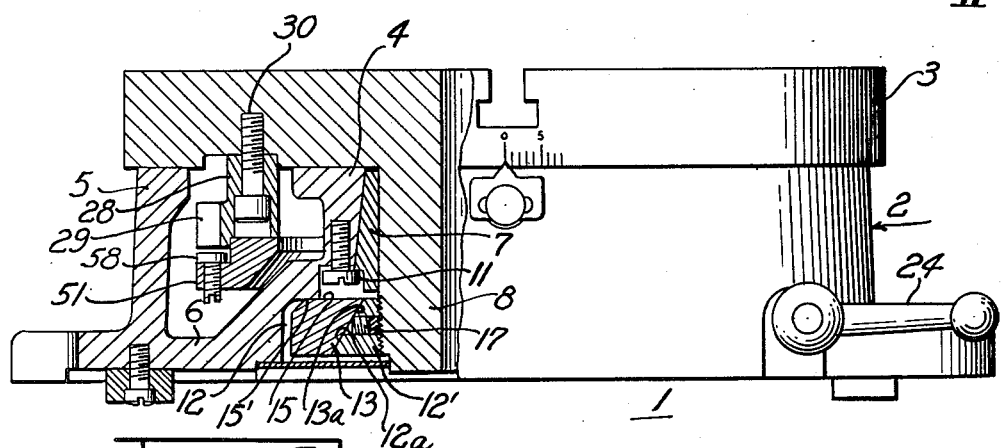
Fig. 2 is a view partly in section and partly in front elevation of the table shown in Fig. 1, taken on line II—II thereof.

In Figs. 1 and 2 of the drawings is illustrated an index table 1, comprising a base 2 and a turntable 3, that is rotatably secured to the base.

The base comprises inner and outer concentric flanges 4 and 5, which are unitary at their bottoms with a plate-like member 6. The plate-like member or portion 6 is annular, and is adapted to be secured to a machine tool in either a vertical or an horizontal position.

The inner flange 4 is hollow to accommodate a bushing 7 and a spindle 8 of the turntable. The bore of the flange 4 and the bushing 7 are tapered, as shown, at their engaging faces. The inner surface of the bushing is cylindrical, to conform to the shape of the spindle 8. The bushing is preferably split, as shown in Figs. 6 and 7, the split line being indicated at 10. As shown in Fig. 2, the bushing is inserted from the under side of the base 2 into the bore of the inner flange 4 and is secured in place by a plurality of screws 11, only one of which is shown. These screws are located approximately 180° apart. By tightening these screws, the bushing 7 is moved upwardly through the bore of flange 4, and as it moves upwardly, the taper causes the bushing to contract on the spindle 8. Thus, as the spindle or the bushing wears in service, the bushing may be adjusted until the wear has been taken up.

In the lower face of the base member 2, an annular recess 12 is formed to accommodate a cone ring 12' that is threaded on the free end of the spindle 8, and a brake ring 13. The cone ring 12', as shown, has a tapered or frusto-conical outer surface 12a. The inner surface of the brake ring 13 is formed with a frusto-conical surface 13a having the same slope or taper as that of surface 12a.

The upper surface 15 of the brake ring is at right angles to the spindle and is disposed to engage the inner wall surface 15' of the recess 12 in which it is mounted. Surface 15' is also flat and parallel to the upper surface 15.

In practice, the cone ring 12' is run in on the threads of the spindle 8, until the brake ring 13 has been adjusted toward the inner wall 12a of the annular recess 12, to a point where the minimum or desired operating clearance is attained. The cone ring is then locked in place by means of Allenhead set screws 17 that engage the threaded surface of the spindle 8.

As shown in Fig. 1, the ends of the brake ring 13 are provided with shoulders 19 and 20, respectively. These shoulders are bored to accommodate a shaft 21, the inner end of which is threaded and carries a nut 22. The face of the nut 22 engages the shoulder 20. Between the ends of the split ring 13 is a coil spring 23, that normally urges the ends of the ring apart to thereby release the grip of ring 13 on the cone ring 12'. The outer end of the shaft extends through the table to the outside. As shown in Fig. 1, the portion of shaft 21 to the right of shoulder 19 is enlarged to form a shoulder 25. Shoulder 25 engages the shoulder 19 of the ring. To the outer end of that shaft is attached a handle 24, by means of which the shaft 21 is turned to pull the ends of the clamp ring towards each other and apply the brake.

Thus, as the shaft 21 is turned into nut 22, the ends of ring 13 are squeezed toward each other, between the nut and the shoulder 24 of the brake shaft and ring 13 grips the cone ring 12'. When the brake handle 24 is turned to apply or constrict the ring on the cone ring 12', the force applied to the tapered surface 12a of the cone ring is in such direction as tends to cause the brake ring 13 to move upwardly. The ring will move upwardly until it abuts the end wall 15' of the annular recess 12. When that abutment occurs, the spindle 8 is pulled downwardly, thereby forcing the table 3 firmly onto the brake ring 13 and onto the adjacent faces of the annular flanges 4 and 5.

As shown in Fig. 2, the outer faces of the annular flanges 4 and 5 are machined to flat surfaces which extend at right angles to the axis of rotation of spindle 8. The adjacent mating face of the table 3 likewise is machined true and flat so that that surface will be parallel to the adjacent surfaces of flanges 4 and 5. Thus, when the brake ring 13 has been constricted as above described, the adjacent faces of the table and the flanges 4 and 5 will be brought firmly into engagement, thereby preventing the table from cocking or wobbling when it is in use and work is being done thereon.

The index table is provided with an index ring 28, having in its outer periphery a plurality of uniformly-spaced notches 29. The index ring is secured to the under side of the table 3, by means of a plurality of cap screws 30 uniformly spaced about the periphery of the ring. The indexing table is provided with an index pin 32, which is mounted in the outer flange 5 of the base. As shown in Fig. 3, the pin is mounted in a hardened steel bushing 33, which is secured in a bore 34 in the flange 5. The outer end of pin 32 is provided with a socket 35 for receiving the inner end of a compression spring 36. The outer end of the bore is threaded and provided with a cap 37 that bears on the outer end of spring 36 and puts that spring under compression, thereby normally urging the index pin 32 toward the index notches on the index ring.

As shown in Fig. 3, the lower side of the index pin 32 is provided with rack teeth 38 that mesh with a pinion 39. Pinion 39 is on a shaft 39a (Fig. 1) mounted in a transverse bore 40 (Fig. 3) in the outer flange 5. A handle 42 (Fig. 1) is attached to the outer end of the pinion shaft 39a, by means of which the index pin may be retracted when it is desired to index table 3 to selected positions.

The index pin 32 may be locked in its retracted position by means of a set screw 44. The inner end of that set screw engages the pinion shaft 39a when it is turned inwardly through the outer flange 5.

As shown in Fig. 8, the inner end of pin 32 that engages the periphery of the index ring 28 is substantially rectangular in cross section and is made concave from side to side, so that only the outer edges 46 and 47 thereof may engage the rim of the index ring 28. The purpose of making the inner end of the index pin concave, as just described, will be explained infra.

In a preferred form of the invention, it is preferred that the index ring 28 be constructed as shown in Fig. 5. As there illustrated, the index ring is of substantially L-shape in section. That is, the vertical leg of the L engages the under face of the table 3. From the lower edge of the ring a flange 47 projects radially outward and forms the horizontal leg of the L, as indicated by numeral 47. The index notches 29 are formed in the periphery of the flange 47.

The masking device is preferably constructed as shown in Figs. 3, 4 and 5. As there illustrated, the masking device includes a ring of substantially L-shape in section, having legs 50 and 51. The inner corner of the L may be beveled, as at 52. The mask ring is secured to the index ring by means of a plurality of screws 53 uniformly distributed about the periphery of the same. These screws, as shown, extend through holes 54 formed in the beveled corner of the masking ring into threaded holes in the lower face of the index ring 28.

The leg 51 in the completed ring forms a peripheral flange that projects radially outward from the inner peripheral flange of ring 28. Flange 51 is spaced below the portion of the index ring in which the index notches 29 are formed. In that flange 51, masking members 56 are mounted. The number of masking members employed may be as many as desired, and, if necessary, equal in number to the number of index notches 29. These masking members comprise screws having round, flat, hardened heads 58, that are disposed between the upper face of flange 51 and the lower face of the flange containing the notches 29. As shown in Figs. 3 and 4, the lower edge of the index pin extends below the lower surface of the flange in which the index notches 29 are formed, and that when the screws 56 are turned in a direction to bring the head 58 down on the flange 51, the index pin will clear the upper faces of the heads of the masking members, and pass into an index notch 29. If, however, the masking member is turned so that the round head 58 is in the position shown in Fig. 4, the inner end of the index pin strikes the periphery of the round head, and is precluded from entering the notch 29, with which it is associated. The screws can be reached through a window 59 in the base 2.

As it was stated above, the purpose of the concave inner end of the index pin would be explained. As indicated in Fig. 8, when the index pin 32 is riding on the smooth surface of the index ring 28 between index notches 29, the edges 46 and 47, only, of the pin engage the rim of the index ring. As the table is turned, carrying the index ring with it, one edge, either edge 46 or edge 47, will pass across the open end of a notch 29, while the other edge still is in contact with the rim of the index ring. As soon as the edge has passed into the open end of a notch, that edge will engage the round surface of the head 58 of a masking member, thereby preventing advance of the pin into that notch. But as the table is turned relative to the index pin, the pin will be supported out of the index notch, so that it can not bind and accidentally become stuck in an index notch. By this construction, the table 3 may be indexed past masked index notches smoothly, and without danger of the index pin falsely entering an index notch.

The particular form of index ring and masking notch illustrated makes it possible to build a complete index table with the masking mechanism built into it. With this construction, no parts of the masking device need be removed from the index table at any time to be lost or mislaid and be unavailable when a machinist needs them.

Having thus described the invention, it will be apparent to those skilled in this art, that various modifications and changes may be made in the illustrated embodiment thereof, without departing from either the spirit or the scope of the invention.

Therefore, what is claimed as new and desired to be secured by Letters Patent is:

1. A masking device for an indexing table having a base, a table rotatably mounted on the base, an indexing ring provided with notches in its periphery, secured to the table, and an index pin slidably mounted on the base and disposed to engage said notches, one edge of said pin extending outwardly of one face of the index ring, said masking device comprising a masking ring secured to one face of said index ring, in coaxial relation therewith, said masking ring having a plurality of masking members threaded into the same, each masking member having a head adjacent the notched periphery of the index ring, adapted to be moved into and out of the path of the pin, to preclude seating of the index pin in preselected notches and to allow said pin to be seated in other preselected notches.

2. A masking device according to claim 1, in which the index ring is provided on its lower face with an outwardly-extending peripheral flange, the index notches being in the periphery thereof, and in which the lower edge of the index pin extends below said peripheral flange, the masking members being adjustable towards the notched flange of the index ring and into contact therewith, so as to form an obstruction to the advance of the index pin into a notch.

3. A masking device for an index table according to claim 1, in which the notch-engaging end of the pin is substantially rectangular and the end surface thereof is concave, so that the edges of the pin which are normal to said flange, engage the flange of the index ring and the heads of said masking screws, to prevent sticking of the pin in notches that are masked, as the masked index ring notches sweep past the index pin.

4. An index ring and mask assembly for an indexing table, comprising a ring adapted to be secured to the under side of the table, and having a radially outwardly-extending peripheral flange provided with index notches, a masking ring secured to the under side of said index ring, and having a flange extending radially outward therefrom and below the notched flange of the index ring, said flange of the index ring being provided with screw threaded members having circular flat heads disposed immediately below the notches in the index ring flange, and being movable upwardly into substantial engagement with the lower edge of the notched flange of the index ring, and in alignment with said notches, to provide an obstruction for an index pin, which is slidably disposed and adapted to move into said notches, and to be precluded from entering said notches by said heads.

5. An index table comprising a base having substantially concentric inner and outer flanges extending at substantially right angles to the base, said inner flange being provided with a tapered bore, a bushing in said bore having a tapered outer surface mating with the taper of said bore, a table having a spindle extending into said bushing, means for adjustably securing the bushing to the inner flange, thereby to adjust the clearance between the spindle and the bearing surface of the bushing, a brake for said table comprising a ring having an outer tapered surface, said ring being threaded on the free end of said spindle, means for adjustably securing said ring to the spindle, a split brake ring having a tapered surface on its inner face engageable with the tapered surface of the spindle ring, the upper face of said split brake ring being substantially flat and engageable by the inner flange of said base member, and means for clamping the split ring against the tapered surface of the spindle ring, thereby pulling the table firmly onto the base and the flat surface of said brake ring, and also clamping the tapered surfaces of the spindle ring and brake ring, thereby locking the table to the base, and rigidly securing the table and the base together.

6. An index table in accordance with claim 5, characterized by the fact that an index ring provided with notches in its periphery is attached to the table and received in the space between the flanges of the base and that an index pin is slidably mounted in the center flange and adapted to move into said notches to lock the table in predetermined positions.

References Cited in the file of this patent

UNITED STATES PATENTS

| Number | Name | Date |
| --- | --- | --- |
| 2,144,486 | Erb | Jan. 17, 1939 |
| 2,358,503 | Godfriaux | Sept. 19, 1944 |